United States Patent Office 2,820,69[7]
Patented Jan. 21, 195[8]

2,820,697

STABILIZATION OF LIQUID SULFUR TRIOXIDE AND OLEUMS

George A. Peirce, Westfield, N. J., assignor to E. I. du Pont de Nemours and Company, Wilmington, Del., a corporation of Delaware No Drawing. Application January 3, 1956
Serial No. 556,815

8 Claims. (Cl. 23—174)

This invention relates to liquid sulfur trioxide and high strength oleums that are stabilized against polymerization; and to the stabilization thereof employing dimethyl sulfoxide as a polymerization inhibitor.

As is well known, sulfur trioxide exists in three forms having melting points of 17° C., 32.5° C. and 62° C. The polymeric form melting at 62° C., alpha $SO_3$, is the stable form under ordinary conditions. Upon freezing or even after standing at room temperature a short time the liquid gamma form (M. P. 17° C.) ordinarily changes to the solid forms.

This transition of liquid sulfur trioxide to solid polymeric forms is extremely undesirable from the standpoint of ease in handling and usage. In most instances, prior to usage the solidified sulfur trioxide must be remelted by heating to temperatures up to about 100° C., thereby developing dangerous high pressures in some instances.

High strength oleums of free sulfur trioxide strengths upward of about 80% tend to polymerize in a similar fashion. The degree of polymerization depends chiefly upon the sulfur trioxide strength of the oleum and the temperatures at which the material is stored. While polymerization will not proceed sufficiently far in some of these oleums to give a completely solid product, the degree of polymerization increases on the passage of time so that the ultimate mass will ordinarily contain solid forms of $SO_3$ in suspension in the oleum. This polymerization of sulfur trioxide in high strength oleums is also highly undesirable.

I have discovered that liquid sulfur trioxide and oleum of $SO_3$ strength such that $SO_3$ polymers tend to form can be stabilized against $SO_3$ polymerization by incorporating therein a minor amount of dimethyl sulfoxide.

The amount of dimethyl sulfoxide to be incorporated in the $SO_3$ or oleum will vary with the use for which the $SO_3$-containing product is intended and with the conditions it will be expected to meet. The stabilizing influence of dimethyl sulfoxide is proportional to the amount present. In general, it usually is desirable to use only sufficient amount to stabilize the product against substantial polymerization of $SO_3$, although relatively larger amounts of dimethyl sulfoxide can be used where the presence of an excess is not objectionable. In most cases it is desirable to use no more than about 10% of dimethyl sulfoxide, with from 0.2–5% based on the free $SO_3$ content being the preferred range. The higher percentages ordinarily are employed to stabilize the oleums.

The preferred compositions of this invention consist of liquid sulfur trioxide or oleum containing not more than about 0.1% of water, which materials are stabilized with from 0.2 to 5% by weight of dimethyl sulfoxide. Oleum containing not more than about 0.1% of water is, of course, oleum of $SO_3$ strength not less than about 99.4% and sulfuric acid content of not more than 0.56%. These materials high in sulfur trioxide can be stabilized readily so as to resist polymerization even after storage for long periods of time.

The dimethyl sulfoxide can be added directly to the liquid sulfur trioxide or oleum to be stabilized, followe[d] by thorough agitation of the liquid. Alternatively, in t[he] case of stabilizing pure liquid sulfur trioxide, $SO_3$ vap[or] can be condensed in a closed vessel containing the desire[d] amount of dimethyl sulfoxide.

After the dimethyl sulfoxide has been incorporated i[n] the liquid sulfur trioxide or oleum, the stability of th[e] product can be improved by heat-treating within the rang[e] of about 50 to 100° C. for several hours. The preferre[d] heat treatment is for at least 5 hours at about 80° C.

Materials stabilized in accordance with my method d[o] not polymerize to any appreciable extent. They remai[n] substantially in the liquid gamma form at room temper[a]ture. Furthermore, the stabilization inhibitor functions [as] an antifreeze, lowering the freezing point substantiall[y] in most instances. After freezing by being cooled to low temperature, these stabilized materials melt rapidl[y] upon being reheated above about 25° C. Therefore, thes[e] products can be used directcly in commercial applicatio[n] without first putting them through a tedious remeltin[g] process.

In order that the invention can be better understoo[d] the following examples in addition to those set forth abov[e] are given:

Example 1

0.5% by weight of dimethyl sulfoxide is added t[o] anhydrous liquid sulfur trioxide and the mixture is we[ll] agitated. The liquid sulfur trioxide is then heated fo[r] five hours at 80° C.

The thusly stabilized sulfur trioxide is then cooled t[o] 5° C., at which temperature it shows no appreciabl[e] tendency to solidify. Apparently, the addition of th[e] dimethyl sulfoxide imparts a definite antifreeze action since gamma liquid sulfur trioxide ordinarily freezes a[t] 17° C. Upon further cooling, it is found that the sta[-]bilized sulfur trioxide freezes at −15° C. Upon reheat[-]ing to room temperature, the stabilized liquid sulfur tri[-]oxide remelts rapidly. After standing at room tempera[-]ture for several days, the composition exhibits no notice[-]able polymerization.

Example 2

One percent by weight of dimethyl sulfoxide is adde[d] to anhydrous liquid sulfur trioxide and the mixture i[s] agitated. After standing at room temperature for 7[2] hours, the thusly stabilized liquid sulfur trioxide show[s] no tendency to polymerize and solidify. This stabilize[d] liquid sulfur trioxide is found to freeze on cooling to 0° C.; it remelts rapidly when reheated to room temperature Example 3

1.5% by weight of dimethyl sulfoxide is added with agi[-]tation to oleum of $SO_3$ strength of 99.5%. After stand[-]ing at room temperature for 72 hours, the thusly sta[-]bilized oleum shows no tendency towards $SO_3$ polymeri[-]zation and solidification.

Example 4

Five percent of dimethyl sulfoxide is added to oleum of 99.7% $SO_3$ strength. Upon standing for 72 hours a[t] room temperature, the thusly stabilized oleum shows n[o] tendency towards solidification.

I claim:

1. The method of stabilizing against $SO_3$ polymeriza[-]tion a compound selected from the group consisting o[f] liquid sulfur trioxide and oleum of $SO_3$ strength suc[h] that $SO_3$ polymers tend to form comprising incorporating therein about 0.2 to 5% by weight based on $SO_3$ conten[t] of dimethyl sulfoxide.

2. The method of stabilizing liquid sulfur trioxide con[-]taining not more than 0.1% of water against $SO_3$ poly[-]

erization comprising incorporating therein about 0.2 to 5% by weight based on $SO_3$ content of dimethyl sulfoxide.

3. The method of stabilizing liquid sulfur trioxide against $SO_3$ polymerization comprising incorporating therein about 0.2 to 5% by weight based on $SO_3$ content of dimethyl sulfoxide.

4. The method of stabilizing against $SO_3$ polymerization a compound selected from the group consisting of liquid sulfur trioxide and oleum of $SO_3$ strength such that $SO_3$ polymers tend to form comprising incorporating therein about 0.2 to 5% by weight based on $SO_3$ content of dimethyl sulfoxide and then heating for several hours at a temperature in the range of 50° C. to 100° C.

5. A composition containing a material selected from the group consisting of sulfur trioxide and oleum of $SO_3$ strength such that $SO_3$ polymers tend to form, in admixture with dimethyl sulfoxide in an amount up to 10% by weight based on $SO_3$ content.

6. A composition comprising a material selected from the group consisting of sulfur trioxide and oleum of $SO_3$ strength such that $SO_3$ polymers tend to form, and about 0.2 to 10% by weight based on $SO_3$ content of dimethyl sulfoxide.

7. A composition comprising liquid sulfur trioxide containing not more than 0.1% of water and between about 0.2 and 5% by weight based on $SO_3$ content of dimethyl sulfoxide.

8. The method of stabilizing against $SO_3$ polymerization the material selected from the group consisting of liquid sulfur trioxide and oleum of $SO_3$ strength such that $SO_3$ polymers tend to form comprising incorporating therein dimethyl sulfoxide in an amount up to 10% by weight based on $SO_3$ content.

References Cited in the file of this patent
UNITED STATES PATENTS 2,648,691    Thompson _____ Aug. 11, 1953